(12) United States Patent
Moldovan

(10) Patent No.: US 8,404,773 B2
(45) Date of Patent: Mar. 26, 2013

(54) COATING COMPOSITION, METHOD OF PRODUCING THE SAME, ARTICLES MADE THEREFROM, AND METHOD OF MAKING SUCH ARTICLES

(75) Inventor: Daniel G. Moldovan, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 1177 days.

(21) Appl. No.: 12/049,709

(22) Filed: Mar. 17, 2008

(65) Prior Publication Data

US 2009/0233115 A1 Sep. 17, 2009

(51) Int. Cl.
*C08K 5/01* (2006.01)
*C08K 5/02* (2006.01)

(52) U.S. Cl. ........ 524/477; 524/556; 525/214; 525/221; 525/232; 525/240

(58) Field of Classification Search .................. 524/477, 524/556; 525/214, 221, 232, 240
See application file for complete search history.

(56) References Cited

U.S. PATENT DOCUMENTS

| | | | |
|---|---|---|---|
| 2,586,363 A | 2/1952 | McAlevy | |
| 3,296,222 A | 1/1967 | Dixon et al. | |
| 3,299,014 A | 1/1967 | Kalil | |
| 3,328,367 A | 6/1967 | Rees | |
| 3,454,544 A | 7/1969 | Young et al. | |
| 3,471,460 A | 10/1969 | Rees | |
| 3,934,056 A * | 1/1976 | Yoshida et al. | 524/109 |
| 4,177,160 A | 12/1979 | Cecchin et al. | |
| 4,591,621 A | 5/1986 | Ennis | |
| 4,767,823 A | 8/1988 | Jones et al. | |
| 4,798,081 A | 1/1989 | Hazlitt et al. | |
| 4,957,968 A * | 9/1990 | Adur et al. | 525/74 |
| 5,242,987 A | 9/1993 | Brugel | |
| 5,272,236 A | 12/1993 | Lai et al. | |
| 5,278,272 A | 1/1994 | Lai et al. | |
| 5,514,761 A | 5/1996 | Etherton et al. | |
| 5,565,521 A | 10/1996 | Effler, Jr. et al. | |
| 6,472,473 B1 | 10/2002 | Ansems et al. | |
| 6,552,129 B2 | 4/2003 | Babb et al. | |
| 6,750,307 B2 * | 6/2004 | Weng et al. | 526/348 |
| 6,841,620 B2 | 1/2005 | Ansems et al. | |
| 2005/0203230 A1 | 9/2005 | Kadakia et al. | |

FOREIGN PATENT DOCUMENTS

| | | |
|---|---|---|
| WO | WO-95/11929 | 5/1995 |
| WO | WO-96/23009 | 8/1996 |
| WO | WO-97/02317 | 1/1997 |
| WO | WO-97/11995 | 4/1997 |
| WO | WO-98/52981 | 11/1998 |
| WO | WO-01/58970 | 8/2001 |
| WO | WO-2005/090427 | 9/2005 |
| WO | WO-2006/124369 | 11/2006 |
| WO | WO2006124369 | * 11/2006 |

OTHER PUBLICATIONS

"How to use Eastman CPOs as adhesion promoters" by Eastman, Sep. 1998.*
Eastman Coating by Eastman, Mar. 2005.*
Williams, T., et al., The Construction of a Polyethylene Calibration Curve for Gel Permeation Chromatography Using Polystyrene Fractions, Journal of Polymer Science; Polymer Letters, 1968, pp. 621-624, vol. 6.
Wild, L., et al., Determination of Branching Distributions in Polyethylene and Ethylene Copolymers, Journal of Polymer Science: Polymer Physics Edition, 1982, pp. 441-455, vol. 20.
Randall, J.C., A Review of High Resolution Liquid $^{13}$Carbon Nuclear Magnetic Resonance Characterizations of Ethylene-Based Polymers, JMS-Reviews Mactomolecular Chemistry and Physics, 1989, pp. 201-317, C29 (2&3).

* cited by examiner

Primary Examiner — Ling Choi
Assistant Examiner — Wenwen Cai

(57) ABSTRACT

The instant invention is a coating composition, method of producing the same, articles made therefrom, and method of making such articles. The coating composition according to the instant invention comprises (a) 10 to 55 percent by weight of an ethylene based copolymer composition; (b) 5 to 25 percent by weight of a propylene polymer composition; (c) 15 to 60 percent by weight of a chlorinated olefin polymer composition; (d) optionally less than 40 percent by weight of a filler; and (e) optionally 1 to 20 weight percent by weight of an adhesion promoting agent.

8 Claims, No Drawings

COATING COMPOSITION, METHOD OF PRODUCING THE SAME, ARTICLES MADE THEREFROM, AND METHOD OF MAKING SUCH ARTICLES

FIELD OF INVENTION

The instant invention relates to a coating composition, method of producing the same, articles made therefrom, and method of making such articles.

BACKGROUND OF THE INVENTION

The use of polymeric materials as coating compositions is generally known. Such polymeric materials may be applied to a substrate via different conventional methods. Such conventional methods include, but are not limited to, calendering process, lamination process, extrusion process, cast sheet process, or combinations thereof. However, polymeric materials such as olefinic elastomers may not be easily processed to form desired articles such as synthetic leather.

Despite the research efforts in developing polymeric materials suitable for coating applications, there is a need for a coating composition that provides improved end-use application properties, e.g. improved dry feel in synthetic leather products, as a well as improved processability, e.g. improved calenderability. Furthermore, there is a need for a process for making such coating compositions.

SUMMARY OF THE INVENTION

The instant invention is a coating composition, method of producing the same, articles made therefrom, and method of making such articles. The coating composition according to the instant invention comprises (a) 10 to 55 percent by weight of an ethylene based copolymer composition; (b) 5 to 25 percent by weight of a propylene polymer composition; (c) 15 to 60 percent by weight of a chlorinated olefin polymer composition; (d) optionally less than 40 percent by weight of a filler; and (e) optionally 1 to 20 weight percent by weight of an adhesion promoting agent. The process for producing the coating composition according to the instant invention comprises the steps of: (1) providing an ethylene based copolymer composition, wherein said ethylene based copolymer composition comprises from 10 to 55 percent by weight based on the weight of the coating composition; (2) providing a propylene polymer composition, wherein said propylene polymer composition comprises from 5 to 25 percent by weight based on the weight of the coating composition; (3) providing a chlorinated olefin polymer composition, wherein said chlorinated olefin polymer composition comprises from 15 to 60 percent by weight based on the weight of the coating composition; (4) optionally providing a filler, wherein said filler comprises from less than 40 percent by weight based on the weight of the coating composition; (5) optionally providing an adhesion promoting agent, wherein said adhesion promoting agent comprises from 1 to 20 percent by weight based on the weight of the coating composition; (6) melt blending said ethylene based copolymer composition, said propylene polymer composition, said chlorinated olefin polymer composition, said optional filler and said optional adhesion promoting agent; and (7) thereby producing said coating composition. The articles according to the instant invention comprise optionally a substrate; and a coating comprising (a) 10 to 55 percent by weight of an ethylene based copolymer composition; (b) 5 to 25 percent by weight of a propylene polymer composition; (c) 15 to 60 percent by weight of a chlorinated olefin polymer composition; (d) optionally less than 40 percent by weight of a filler; and (e) optionally 1 to 20 weight percent by weight of an adhesion promoting agent. The method for making the inventive articles comprises the steps of (1) providing a substrate; (2) providing a coating composition comprising (a) 10 to 55 percent by weight of an ethylene based copolymer composition; (b) 5 to 25 percent by weight of a propylene polymer composition; (c) 15 to 60 percent by weight of a chlorinated olefin polymer composition; (d) optionally less than 40 percent by weight of a filler; and (e) optionally 1 to 20 weight percent by weight of an adhesion promoting agent (3) coating said coating composition into onto at least one surface of said substrate; and (4) thereby forming said article.

In one embodiment, the instant invention provides a coating composition comprising: (a) 10 to 55 percent by weight of an ethylene based copolymer composition; (b) 5 to 25 percent by weight of a propylene polymer composition; (c) 15 to 60 percent by weight of a chlorinated olefin polymer composition; (d) optionally less than 40 percent by weight of a filler; and (e) optionally 1 to 20 weight percent by weight of an adhesion promoting agent.

In an alternative embodiment, the instant invention further provides a process for producing the coating composition comprising the steps of: (1) providing an ethylene based copolymer composition, wherein said ethylene based copolymer composition comprises from 10 to 55 percent by weight based on the weight of the coating composition; (2) providing a propylene polymer composition, wherein said propylene polymer composition comprises from 5 to 25 percent by weight based on the weight of the coating composition; (3) providing a chlorinated olefin polymer composition, wherein said chlorinated olefin polymer composition comprises from 15 to 60 percent by weight based on the weight of the coating composition; (4) optionally providing a filler, wherein said filler comprises from less than 40 percent by weight based on the weight of the coating composition; (5) optionally providing an adhesion promoting agent, wherein said adhesion promoting agent comprises from 1 to 20 percent by weight based on the weight of the coating composition; (6) melt blending said ethylene based copolymer composition, said propylene polymer composition, said chlorinated olefin polymer composition, said optional filler and said optional adhesion promoting agent; and (7) thereby producing said coating composition.

In another alternative embodiment, the instant invention further provides an article comprising optionally a substrate; and a coating comprising (a) 10 to 55 percent by weight of an ethylene based copolymer composition; (b) 5 to 25 percent by weight of a propylene polymer composition; (c) 15 to 60 percent by weight of a chlorinated olefin polymer composition; (d) optionally less than 40 percent by weight of a filler; and (e) optionally 1 to 20 weight percent by weight of an adhesion promoting agent.

In another alternative embodiment, the instant invention further provides a method for making an article comprising the steps of: (1) providing a substrate; (2) providing a coating composition comprising (a) 10 to 55 percent by weight of an ethylene based copolymer composition; (b) 5 to 25 percent by weight of a propylene polymer composition; (c) 15 to 60 percent by weight of a chlorinated olefin polymer composition; (d) optionally less than 40 percent by weight of a filler; and (e) optionally 1 to 20 weight percent by weight of an adhesion promoting agent (3) coating said coating composition onto at least one surface of said substrate; and (4) thereby forming said article.

In an alternative embodiment, the instant invention provides a coating composition, method of producing the same, articles made therefrom, and method of making such articles, in accordance with any of the preceding embodiments, except that coating composition further comprises a stabilizing agent.

In an alternative embodiment, the instant invention provides a coating composition, method of producing the same, articles made therefrom, and method of making such articles, in accordance with any of the preceding embodiments, except that coating composition further comprises a processing aid.

In an alternative embodiment, the instant invention provides a coating composition, method of producing the same, articles made therefrom, and method of making such articles, in accordance with any of the preceding embodiments, except that coating composition further comprises a pigment.

In an alternative embodiment, the instant invention provides a coating composition, method of producing the same, articles made therefrom, and method of making such articles, in accordance with any of the preceding embodiments, except that coating composition further comprises a plasticizer.

In an alternative embodiment, the instant invention provides a coating composition, method of producing the same, articles made therefrom, and method of making such articles, in accordance with any of the preceding embodiments, except that the filler is calcium carbonate.

In an alternative embodiment, the instant invention provides a coating composition, method of producing the same, articles made therefrom, and method of making such articles, in accordance with any of the preceding embodiments, except that the adhesion promoting agent is maleic anhydride grafted polyolefin copolymer.

In an alternative embodiment, the instant invention provides a article, in accordance with any of the preceding embodiments, except that the article is synthetic leather, automotive upholstery, recreational vehicle upholstery, marine upholstery, seating for hospitality, fitness equipment covering, footwear, apparel, banners, tarpaulins, awning, furniture upholstery, medical sheeting, medical drapery, floor covering, wall covering, window covering, book covering, or luggage.

In an alternative embodiment, the instant invention provides a method of making an article, in accordance with any of the preceding embodiments, except that the coating step is achieved via calendering process, lamination process, extrusion process, cast sheet process, or combinations thereof.

In an alternative embodiment, the instant invention provides a method of making an article, in accordance with any of the preceding embodiments, except that the method further comprising the step of urethane top coating.

DETAILED DESCRIPTION OF THE INVENTION

The instant invention is a coating composition, method of producing the same, articles made therefrom, and method of making such articles. The coating composition according to the instant invention comprises (a) 10 to 55 percent by weight of an ethylene based copolymer composition; (b) 5 to 25 percent by weight of a propylene polymer; (c) 15 to 60 percent by weight of a chlorinated olefin polymer composition; (d) less than 40 percent by weight of a filler; and (e) 1 to 20 weight percent by weight of an adhesion promoting agent.

The ethylene based copolymer composition may comprise any ethylene copolymer; for example, the ethylene based copolymer comprise an elastomeric ethylene copolymer. Elastomeric ethylene copolymers such as ethylene/alpha-olefin copolymers are copolymers of ethylene with at least one $C_3$-$C_8$ alpha-olefin (preferably an aliphatic alpha-olefin) comonomer, and optionally, a polyene comonomer, e.g., a conjugated diene, a nonconjugated diene, a triene, etc. Examples of the $C_3$-$C_8$ alpha-olefins include, but are not limited to, propene, 1-butene, 4-methyl-1-pentene, 1-hexene, and 1-octene. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. Although not alpha-olefins in the classical sense of the term, for purposes of this invention certain cyclic olefins, such as norbornene and related olefins, are alpha-olefins and can be used in place of some or all of the alpha-olefins described above. Similarly, styrene and its related olefins (e.g., alpha-methylstyrene, etc.) are alpha-olefins for purposes of this invention.

Polyenes are unsaturated aliphatic or alicyclic compounds containing more than four carbon atoms in a molecular chain and having at least two double and/or triple bonds, e.g., conjugated and nonconjugated dienes and trienes. Examples of nonconjugated dienes include, but are not limited to, aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo-[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidene-5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene, 5-vinyl-2-norbornene and 7-methyl-1,6-octadiene preferred nonconjugated dienes.

Examples of conjugated dienes include, but are not limited to, butadiene, isoprene, 2,3-dimethylbutadiene-1,3,1,2-dimethylbutadiene-1,3,1,4-dimethylbutadiene-1,3,1-ethylbutadiene-1,3,2-phenylbutadiene-1,3, hexadiene-1,3,4-methylpentadiene-1,3,1,3-pentadiene ($CH_3CH$=$CH$—$CH$=$CH_2$; commonly called piperylene), 3-methyl-1,3-pentadiene, 2,4-dimethyl-1,3-pentadiene, 3-ethyl-1,3-pentadiene, and the like; with 1,3-pentadiene a preferred conjugated diene.

Examples of trienes include 1,3,5-hexatriene, 2-methyl-1,3,5-hexatriene, 1,3,6-heptatriene, 1,3,6-cycloheptatriene, 5-methyl-1,3,6-heptatriene, 5-methyl-1,4,6-heptatriene, 1,3,5-octatriene, 1,3,7-octatriene, 1,5,7-octatriene, 1,4,6-octatriene, 5-methyl-1,5,7-octatriene, 6-methyl-1,5,7-octatriene, 7-methyl-1,5,7-octatriene, 1,4,9-decatriene and 1,5,9-cyclodecatriene.

Exemplary ethylene copolymers include, but are not limited to, ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene and ethylene/1,3,5-hexatriene. Exemplary terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene and ethylene/propylene/1,3,5-hexatriene. Exemplary tetrapolymers include ethylene/propylene/1-octene/diene (e.g. ENB), ethylene/butene/1-octene/diene and ethylene/propylene/mixed dienes, e.g. ethylene/propylene/5-ethylidene-2-norbornene/piperylene. In addition, the blend components can include minor amounts, e.g. 0.05 0.5 percent by weight, of long chain branch enhancers, such as 2,5-norbornadiene (aka bicyclo[2,2,1]hepta-2,5-diene), diallyl-benzene, 1,7-octadiene ($H_2C=CH(CH_2)_4CH=CH_2$), and 1,9-decadiene ($H_2C=CH(CH_2)_6CH=CH_2$).

Such elastomeric ethylene copolymers can be produced using any conventional olefin polymerization technology known in the art. For example, polymerization may be accomplished at conditions well known in the art for Ziegler-Natta or Kaminsky-Sinn type polymerization reactions. Such elastomeric ethylene copolymers may also be made using a mono- or bis-cyclopentadienyl, indenyl, or fluorenyl transition metal (preferably Group 4) catalysts, constrained geometry catalysts, or metallocene catalysts. Metallocene catalysts and polymerization processes using these catalysts are described and taught in U.S. Pat. No. 5,565,521. Suspension, solution, slurry, gas phase, solid-state powder polymerization or other process conditions may be employed if desired. A support, such as silica, alumina, or a polymer (such as polytetrafluoroethylene or a polyolefin) may also be employed if desired.

Inert liquids serve as suitable solvents for polymerization. Examples include, but are not limited to, straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene. Suitable solvents also include liquid olefins that may act as monomers or comonomers including butadiene, cyclopentene, 1-hexene, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure and used herein.

In other selected embodiments, olefin block copolymers, e.g. ethylene multi-block copolymer, such as those described in the International Publication No. WO2005/090427 and U.S. patent application Ser. No. 11/376,835 may be used as the ethylene based copolymer composition. Such olefin block copolymer may be an ethylene/α-olefin interpolymer:
  (a) having a Mw/Mn from about 1.7 to about 3.5, at least one melting point, Tm, in degrees Celsius, and a density, d, in grams/cubic centimeter, wherein the numerical values of Tm and d corresponding to the relationship:

$Tm>-2002.9+4538.5(d)-2422.2(d)_2$; or (b) having a Mw/Mn from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$ΔT>-0.1299(ΔH)+62.81$ for ΔH greater than zero and up to 130 J/g, $ΔT≧48°$ C. for ΔH greater than 130 J/g, wherein the CRYSTAF peak being determined using at least 5 percent of the cumulative polymer, and if less than 5 percent of the polymer having an identifiable CRYSTAF peak, then the CRYSTAF temperature being 30° C.; or
  (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$Re>1481-1629(d)$; or (d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or
  (e) having a storage modulus at 25° C., G'(25° C.), and a storage modulus at 100° C., G'(100° C.), wherein the ratio of G'(25° C.) to G'(100° C.) being in the range of about 1:1 to about 9:1.

The ethylene/α-olefin interpolymer may be an ethylene/α-olefin interpolymer also:
  (a) having a molecular fraction which elutes between 40° C. and 130° C. when fractionated using TREF, characterized in that the fraction having a block index of at least 0.5 and up to about 1 and a molecular weight distribution, Mw/Mn, greater than about 1.3; or
  (b) having an average block index greater than zero and up to about 1.0 and a molecular weight distribution, Mw/Mn, greater than about 1.3.

The coating composition may comprise from 10 to 55 percent by weight of the ethylene based copolymer composition based on the weight of the coating composition. All individual values and subranges from 10 to 55 weight percent are included herein and disclosed herein; for example, the weight percent can be from a lower limit of 10, 15, 20, 25, 30, 35, 40, or 50 to an upper limit of 12, 15, 20, 25, 30, 35, 40, 50, or 55. For example, the coating composition may comprise from 15 to 55 percent by weight of the ethylene based copolymer composition based on the weight of the coating composition; or in the alternative, the coating composition may comprise from 20 to 55 percent by weight of the ethylene based copolymer composition based on the weight of the coating composition; or in the alternative, the coating composition may comprise from 25 to 55 percent by weight of the ethylene based copolymer composition based on the weight of the coating composition; or in the alternative, the coating composition may comprise from 35 to 55 percent by weight of the ethylene based copolymer composition based on the weight of the coating composition; or in the alternative, the coating composition may comprise from 15 to 45 percent by weight of the ethylene based copolymer composition based on the weight of the coating composition; or in the alternative, the coating composition may comprise from 20 to 45 percent by weight of the ethylene based copolymer composition based on the weight of the coating composition; or in the alternative, the coating composition may comprise from 25 to 45 percent by weight of the ethylene based copolymer composition based on the weight of the coating composition. Such ethylene based copolymer compositions are commercially available under the tradename ENGAGE™ from The Dow Chemical Company, EXACT™ from ExxonMobil Chemical Company, or TAFMER™ from Mitsui Chemical.

The propylene polymer composition may comprise any propylene polymer; for example, the propylene polymer may comprise a propylene homopolymer; or in the alternative, it may comprise a propylene copolymer. Furthermore, the propylene polymer may comprise a non-branched propylene polymer, a branched propylene polymer, or combinations thereof.

A non-branched polypropylene polymer may be a homopolymer of propylene, a copolymer of propylene with at least one alpha-olefin, or a blend of a propylene homopolymer and a propylene copolymer or a nucleated propylene homopolymer, a nucleated propylene copolymer or a nucleated blend of a propylene homopolymer and a propylene copolymer. The alpha-olefin in the propylene copolymer may, for example, be ethylene, 1-butene, 1-hexene or 4-methyl-1-pentene. The alpha-olefin in the propylene copolymer may preferably be ethylene. The propylene copolymer may be a random copolymer or a block copolymer or a blend of a random copolymer and a block copolymer.

A branched propylene polymer may be a branched propylene homopolymer or a branched propylene copolymer. Other suitable branched propylene-based polymers include branched copolymers of propylene with at least one α-olefin; or a blend of a branched homopolymer and/or a branched copolymer; and/or a nucleated homopolymer, a nucleated copolymer or a nucleated blend of a branched homopolymer and a branched copolymer. The branched polypropylene polymer component can also comprise a polypropylene impact copolymer, which has been branched and/or rheology modified via azide coupling, to provide a branched and/or coupled polypropylene impact copolymer. Polypropylene impact copolymers can be prepared as described in the International Publication No. WO 01/58970, incorporated herein in its entirety by reference. The '970 reference describes reactor produced propylene impact copolymers containing a propylene homopolymer or copolymer and a propylene copolymer containing 20 percent to 70 percent by weight of ethylene, butene, hexane and/or octene comonomer. Suitable branched polypropylenes also include, but are not limited to, branched and/or coupled polypropylene formed by radiation, such as e-beam or gamma radiation, with or without the presence of a coagent. Such branching reactions are typically done under an inert atmosphere. Other suitable branched polypropylene polymers include, but are not limited to, coupled polymers, as described in U.S. Pat. No. 6,552,129, incorporated herein in its entirety by reference. As described in U.S. Pat. No. 6,552,129, a poly(sulfonyl azide) coupled polymer is formed by the following steps: (a) forming a first admixture of a first polymer and a poly(sulfonyl azide); (b) then forming a second admixture of the first admixture with a second amount of at least one second polymer; and (c) heating the second admixture at least to the decomposition temperature of the coupling agent for a time sufficient to result in coupling of polymer chains. Additional branched propylene polymers may be formed from the reaction product or blend product of at least one ethylene-based elastomer, a coupling amount of at least one poly(sulfonyl azide) and a propylene-based polymer.

As here used, "branched polypropylene," "branched propylene homopolymer," "branched copolymer of propylene and one or more α-olefins," or similar term, means a polypropylene containing one or more H-type or T-type branching. H-type branching or T-type branching is generally know to a person of ordinary skilled in the art; for example, such H-type branching and T-type branching is described and taught in the International Publication No. WO 2006/124369, which is incorporated herein by reference to the extent that it describes H-type branching and/or T-type branching. Isotactic polypropylene homopolymers or copolymers having long chain branching (LCB) are exemplary of T-type branched polypropylenes. Branched polypropylenes having H-type branching can be produced using reactive extrusion, as described in U.S. Pat. Nos. 6,472,473 and 6,841,620, or irradiation as described in U.S. Pat. No. 5,514,761. Each of these three patents is incorporated herein, in its entirety, by reference. Suitable branched polypropylenes also include, but are not limited to, polymers containing polyethylene branches incorporated into the polypropylene backbone, as described in U.S. Pat. No. 6,750,307, incorporated herein by reference. Here a branched olefin copolymer having an isotactic polypropylene backbone contains polyethylene branches, and, optionally, one or more comonomers. Typically, the total comonomer content of the branched olefin copolymer is from 0 to 20 mole percent. Also, the mass ratio of the isotactic polypropylene to the polyethylene typically ranges from 99.9:0.1 to 50:50. Such branched propylene copolymers may be prepared, as described in U.S. Pat. No. 6,750,307, by the following steps: a) copolymerizing ethylene, optionally with one or more copolymerizable monomers, in a polymerization reaction under conditions sufficient to form copolymer having greater than 40 percent chain end-group unsaturation; b) copolymerizing the product of a) with propylene and, optionally, one or more copolymerizable monomers, in a polymerization reactor under suitable polypropylene polymerization conditions using a chiral, stereorigid transition metal catalyst capable of producing isotactic polypropylene; and c) recovering a branched olefin copolymer.

The α-olefin in the branched propylene copolymer may be ethylene, 1-butene, 1-hexene or 4-methyl-1-pentene. The α-olefin in the propylene copolymer may preferably be ethylene. The copolymer may be a random copolymer or a block copolymer or a blend of a random copolymer and a block copolymer.

The propylene polymer may have a melt flow rate (MFR) (at 230° C. and 2.16 kg weight) from 0.1 to 150 g/10 minutes. All individual values and subranges from 0.1 to 150 g/10 minutes are included herein and disclosed herein; for example, the MFR can be from a lower limit of 0.1, 0.3, 0.5, 0.8, 1, 2, 5, 10, 15, 20, 25, 30, 35, 40, or 50 g/10 minutes to an upper limit of 5, 10, 15, 20, 25, 30, 35, 40, 50, 60, 80, 100, or 150 g/10 minutes. For example, the propylene polymer may have a melt flow rate (MFR) (at 230° C. and 2.16 kg weight) from 0.3 to 150 g/10 minutes; or in the alternative, the propylene polymer may have a melt flow rate (MFR) (at 230° C. and 2.16 kg weight) from 0.3 to 60 g/10 minutes; or in the alternative, the propylene polymer may have a melt flow rate (MFR) (at 230° C. and 2.16 kg weight) from 0.4 to 40 g/10 minutes; or in the alternative, the propylene polymer may have a melt flow rate (MFR) (at 230° C. and 2.16 kg weight) from 0.8 to 25 g/10 minutes; or in the alternative, the propylene polymer may have a melt flow rate (MFR) (at 230° C. and 2.16 kg weight) from 0.8 to 10 g/10 minutes; or in the alternative, the propylene polymer may have a melt flow rate (MFR) (at 230° C. and 2.16 kg weight) from 0.8 to 5 g/10 minutes. The propylene polymer may have a melting point greater than 120° C. All individual values and subranges from greater that 120° C. are included herein and disclosed herein; for example, the melting point can be from a lower limit of 120° C., 130° C., 140° C., 150° C., 160° C., or 170° C. to an upper limit of 125° C., 130° C., 140° C., 150° C., 160° C., 170° C., 180° C., 190° C., or 200° C. For example, the propylene polymer may have a melting point in the range of 120° C. to 200° C.; or in the alternative, the propylene polymer may have a melting point in the range of 120° C. to 180° C.; or in the alternative, the propylene polymer may have a melting point in the range of 130° C. to 180° C.; or in the alternative, the propylene polymer may have a melting point in the range of 140° C. to 170° C.

In one embodiment, the polypropylene polymer has a melt strength from 5 cN to 50 cN; in the alternative, from 5 cN to 35 cN, and in another alternative, from 5 cN to 20 cN. All individual values and subranges from 5 cN to 50 cN are included herein and disclosed herein.

The term "nucleated," as used herein, refers to a propylene polymer that has been modified by the addition of a nucleating agent such as Millad™, a dibenzyl sorbitol commercially available from Milliken. Other conventional nucleating agents may also be used.

Preparation of the Polypropylene Polymer can Involve the Use of Ziegler Catalysts Such as a titanium trichloride in combination with aluminum diethylmonochloride, as described by Cecch in the U.S. Pat. No. 4,177,160. Polymerization processes used to produce such high melting polymers include the slurry process, which is run at temperature in the range of 50-90° C. and a pressure in the rage of 0.5-1.5 MPa (5-15 atm), and both the gas-phase and liquid-monomer processes in which extra care must be given to the removal of amorphous polymer. An alpha-olefin copolymer may be added to the reaction to form a block copolymer. The polypropylene polymer may also be prepared by using any of a variety of metallocene, single site and constrained geometry catalysts together with their associated processes.

The coating composition may comprise from 5 to 25 percent by weight of the propylene polymer composition based on the weight of the coating composition. All individual values and subranges from 5 to 25 weight percent are included herein and disclosed herein; for example, the weight percent can be from a lower limit of 5, 7, 10, 12, 15, 18, 20, or 22 to an upper limit of 7, 10, 12, 15, 18, 20, 22, or 25. For example, the coating composition may comprise from 7 to 25 percent by weight of the propylene polymer composition based on the weight of the coating composition; or in the alternative, the coating composition may comprise from 10 to 25 percent by weight of the propylene polymer composition based on the weight of the coating composition; or in the alternative, the coating composition may comprise from 12 to 25 percent by weight of the propylene polymer composition based on the weight of the coating composition; or in the alternative, the coating composition may comprise from 10 to 22 percent by weight of the propylene polymer composition based on the weight of the coating composition; or in the alternative, the coating composition may comprise from 10 to 20 percent by weight of the propylene polymer composition based on the weight of the coating composition. Suitable branched polypropylene include PROFAX™ branched polypropylenes available from Basell, DAPLOY™ from Borealis, and INSPIRE™ from The Dow Chemical Company.

The chlorinated olefin polymer composition may be any chlorinated olefin polymer. For example, the chlorinated olefin polymer may be selected from the group consisting of a) chlorinated polyethylene homopolymers and b) chlorinated copolymers prepared from polyolefins that contain copolymerized units of i) ethylene and ii) a copolymerizable monomer. The chlorinated olefin polymer may optionally include chlorosulfonyl groups. That is, the polymer chain will have pendant chlorine groups and chlorosulfonyl groups. Such polymers are known as chlorosulfonated olefin polymers. Representative chlorinated olefin polymers include, but are not limited to, a) chlorinated and chlorosulfonated homopolymers of ethylene and b) chlorinated and chlorosulfonated copolymers of ethylene and at least one ethylenically unsaturated monomer selected from the group consisting of $C_3$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids. Chlorinated and chlorosulfonated graft copolymers are included as well. Specific examples of suitable polymers include, but are not limited to, chlorinated polyethylene; chlorosulfonated polyethylene; chlorinated ethylene vinyl acetate copolymers; chlorosulfonated ethylene vinyl acetate copolymers; chlorinated ethylene acrylic acid copolymers; chlorosulfonated ethylene acrylic acid copolymers; chlorinated ethylene methacrylic acid copolymers; chlorosulfonated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; chlorinated copolymers of ethylene with propylene, butene, 3-methyl-1-pentene, or octene and chlorosulfonated copolymers of ethylene with propylene, butene, 3-methyl-1-pentene or octene. The copolymers may be dipolymers, terpolymers, or higher order copolymers. Alternative exemplary chlorinated olefin polymers include, but are not limited to, chlorinated polyethylene and chlorinated copolymers of ethylene vinyl acetate.

The chlorinated olefin polymers and chlorosulfonated olefin polymers may, for example, be prepared from polyolefin resins that are branched or unbranched. The polyolefin base resins may be prepared via free radical processes, Ziegler-Natta catalysis, or catalysis with metallocene catalyst systems, for example those disclosed in U.S. Pat. Nos. 5,272,236 and 5,278,272. Chlorination or chlorosulfonation of the base resins may take place in suspension, solution, solid state or fluidized bed. Free radical suspension chlorination processes are described and taught in U.S. Pat. No. 3,454,544, U.S. Pat. No. 4,767,823 and references cited therein. Such processes involve preparation of an aqueous suspension of a finely divided ethylene polymer that is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823. Chlorosulfonation processes are generally performed in solution but suspension and non-solvent processes are also known. Preparation of chlorosulfonated olefin polymers is described in U.S. Pat. Nos. 2,586,363, 3,296,222, 3,299,014, and 5,242,987.

The coating composition may comprise from 15 to 60 percent by weight of the chlorinated olefin polymer composition based on the weight of the coating composition. All individual values and subranges from 15 to 60 weight percent are included herein and disclosed herein; for example, the weight percent can be from a lower limit of 15, 20, 25, 30, 35, 40, or 45 to an upper limit of 20, 25, 30, 35, 40, 45, 50, 55, or 60. For example, the coating composition may comprise from 15 to 55 percent by weight of the chlorinated olefin polymer composition based on the weight of the coating composition; or in the alternative, the coating composition may comprise from 20 to 55 percent by weight of the chlorinated olefin polymer composition based on the weight of the coating composition; or in the alternative, the coating composition may comprise from 25 to 55 percent by weight of the chlorinated olefin polymer composition based on the weight of the coating composition; or in the alternative, the coating composition may comprise from 15 to 45 percent by weight of the chlorinated olefin polymer composition based on the weight of the coating composition; or in the alternative, the coating composition may comprise from 20 to 45 percent by weight of the chlorinated olefin polymer composition based on the weight of the coating composition; or in the alternative, the coating composition may comprise from 25 to 40 percent by weight of the chlorinated olefin polymer composition based on the weight of the coating composition. Suitable chlorinated olefin polymer compositions include TYRIN™ available from The Dow Chemical Company, or HYPALON™ from DuPont Performance Elastomers.

The filler may be any filler. For example, the filler may be selected from the group consisting of wollastonite, carbon black, glass, metal carbonates such as calcium carbonate, metal sulfates such as calcium sulfate, talc, clay or graphite fibers. The filler may, for example, be calcium carbonate. The coating composition may optionally comprise less than 40 percent by weight of one or more fillers based on the weight of the coating composition. All individual values and subranges from less than 40 weight percent are included herein and disclosed herein; for example, the weight percent can be from a lower limit of 0.5, 1, 5, 10 15, 20, 30, or 35 to an upper limit of 1, 5, 10 15, 20, 30, 35, or 39. For example, the coating composition may optionally comprise 0.5 to 35 percent by weight of one or more fillers based on the weight of the coating composition; or in the alternative, the coating composition may optionally comprise 5 to 35 percent by weight of one or more fillers based on the weight of the coating composition; or in the alternative, the coating composition may optionally comprise 10 to 39 percent by weight of one or more fillers based on the weight of the coating composition; or in the alternative, the coating composition may optionally comprise 15 to 39 percent by weight of one or more fillers based on the weight of the coating composition; or in the alternative, the coating composition may optionally comprise 15 to 25 percent by weight of one or more fillers based on the weight of the coating composition.

The adhesion promoting agent may be any additive facilitating the adhesion of the coating composition to a substrate. Exemplary adhesion promoting agents include, but are not limited to, acid or acid derivative functionalized polyolefins. In general, such acid or acid derivative functionalized polyolefins are produced by copolymerizing an acid or acid derivative monomer with an $\alpha$-olefin or $\alpha$-olefin mixture or by grafting the monomer onto a polyolefin, e.g., polyethylene. Ionomers of these acid functionalized polyolefins can also be used. Acid or acid derivative monomers copolymerized or grafted to obtain the modified polyolefins are ethylenically unsaturated carboxylic acids or acid derivatives, such as acid anhydrides, esters, salts or the like. Useful monomers include, but are not limited to, acrylic acid, methacrylic acid, maleic acid, fumaric acid, itaconic acid, citraconic acid, mesaconic acid, maleic anhydride (MAH), 4-methyl cyclohex-4-ene-1,2-dicarboxylic acid anhydride, bicyclo(2.2.2) oct-5-ene-2,3-dicarboxylic acid anhydride, 1,2,3,4,5,8,9,10-octahydronaphthalene-2,3-dicarboxylic acid anhydride, bicyclo(2.2.1)hept-5-ene-2,3-dicarboxylic acid anhydride, tetrahydrophthhalic anhydride, norborn-5-ene-2,3-dicarboxylic acid anhydride, and x-methylbicyclo(2.2.1)hept-5-ene-2,3-dicarboxylic acid anhydride(XMNA).

In one embodiment, the functionalized, i.e., modified, polyolefin may be obtained by grafting an ethylenically unsaturated carboxylic acid or derivative such as esters of unsaturated carboxylic acids, and particularly maleic anhydride (MAH), onto a polyolefin backbone. Exemplary maleic anhydride grafted polyolefin copolymers include, but are not limited to, AMPLIFY™ GR 216 commercially available from The Dow Chemical Company.

Suitable $\alpha,\beta$-ethylenically unsaturated carboxylic acids include, but are not limited to, acrylic acids, methacrylic acids, itaconic acids, maleic acids, maleic anhydrides, fumaric acids, monomethyl maleic acids, and mixtures thereof. Preferably, the $\alpha,\beta$-ethylenically unsaturated carboxylic acids are selected from the group consisting of acrylic acids, methacrylic acids, and mixtures thereof. Examples of ethylene acrylic acid copolymers include PRIMACOR™ copolymers available from The Dow Chemical Company, and NUCREL™, ethylene methacrylic acid copolymers available from DuPont.

Specific examples of preferred esters of unsaturated carboxylic acids include, but are not limited to, methyl acrylates, methyl methacrylates, ethyl acrylates, ethyl methacrylates, propyl acrylates, propyl methacrylates, isopropyl acrylates, isopropyl methacrylates, butyl acrylates, butyl methacrylates, isobutyl acrylates, isobutyl methacrylate, tert-butyl acrylates, tert-butyl methacrylates, octyl acrylates, octyl methacrylates, undecyl acrylates, undecyl methacrylates, octadecyl acrylates, octadecyl methacrylates, dodecyl acrylates, dodecyl methacrylates, 2-ethylhexyl acrylates, 2-ethylhexyl methacrylates, isobornyl acrylates, isobornyl methacrylates, lauryl acrylates, lauryl methacrylates, 2-hydroxyethyl acrylates, 2-hydroxyethyl methacrylates, glycidyl acrylates, glycidyl methacrylates, poly(ethylene glycol)acrylates, poly(ethylene glycol)methacrylates, poly(ethylene glycol) methyl ether acrylates, poly(ethylene glycol) methyl ether methacrylates, poly(ethylene glycol) behenyl ether acrylates, poly(ethylene glycol) behenyl ether methacrylates, poly(ethylene glycol) 4-nonylphenyl ether acrylates, poly(ethylene glycol) 4-nonylphenyl ether methacrylates, poly(ethylene glycol) phenyl ether acrylates, poly(ethylene glycol) phenyl ether methacrylates, dimethyl maleates, diethyl maleates, dibutyl maleates, dimethyl fumarates, diethyl fumarates, dibutyl fumarates, dimenthyl fumarates, vinyl acetates, vinyl propionates, and the like and mixtures thereof. Preferably, the other unsaturated comonomers are selected from the group consisting of methyl acrylates, methyl methacrylates, butyl acrylates, butyl methacrylates, glycidyl methacrylates, vinyl acetates, and mixtures thereof. Commercial examples include AMPLIFY™ EA copolymers, which are ethylene ethyl acrylate copolymers, available from The Dow Chemical Company.

Suitable ionomers may be ionic compounds which are copolymers of $C_2$ to $C_4$ $\alpha$-olefin derived units (ethylene is herein included as an "$\alpha$-olefin"), and $C_3$ to $C_6$ $\alpha,\beta$-ethylenically unsaturated carboxylic acids, and which contain one or more kinds of metallic ions associated with the acidic pendant groups of the polymer. Typical ionomers and methods of production are disclosed in, for example, WO 98/52981, WO 95/11929. WO 96/23009, WO 97/11995, and WO 97/02317.

The uncomplexed metal ions suitable for forming the ionic copolymers comprise mono, di or tri-valent metal ions in the Groups 1 through 13 of the Periodic Table of Elements. Embodiments include the following metal ions: $Na^+$, $K^+$, $Li^+$, $Cs^+$, $Ag^+$, $Hg^+$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Pb^{2+}$, $Fe^{2+}$, $Co^{2+}$, $Ni^{2+}$, $Zn^{2+}$, $Al^{2+}$, $Sc^{3+}$, $Fe^{3+}$, $Al^{3+}$ and $Yt^{3+}$. In the various ions mentioned above, $Mg^{2+}$, $Na^+$ and $Zn^{2+}$ are metals used in desirable embodiments. Reaction of the carboxylic acid groups of the ionomer and a metal ion derived from a desirable metal compound (metal oxide, metal chloride, etc.) is referred to as "neutralization."

Ionomers comprising copolymers ethylene derived units and acrylic acid (AA) derived units are desirable. Examples of commercially available ionomers include, but are not limited to, IOTEK™ series such as IOTEK™ 8000, a 45% sodium neutralized ethylene-based ionomer of 15 wt % acrylic acid, and IOTEK™ 7030, a 25% zinc neutralized ethylene-based ionomer of 15 wt % acrylic acid, available from ExxonMobil Chemical Company, and SURLYN™ resins available from DuPont Company, and PRIMACOR™ available from The Dow Chemical Company.

These ionomers can also be neutralized with amine compounds. The ethylene acid copolymers are neutralized with one or more amines to a level of from about 1 to about 100 mol %, based on the copolymer's total carboxylic acid content. The amines may be aliphatic or cycloaliphatic. They may be diamines, triamines, or polyamines. They may incorporate primary amine functions, secondary amine functions, or mixtures thereof. The amine component may incorporate primary amine functions. The amine component may incorporate from 2 to 100 carbon atoms. In the alternative, the amine component may incorporate from 2 to 50 carbon atoms. Exemplary amines include, but are not limited to, ethylene diamine, 1,3-diaminopropane, 1,2-diaminopropane, 1,4-diaminobutane, 1,2-diamino-2-methylpropane, 1,3-diaminopentane, 1,5-diaminopentane, 2,2-dimethyl, 1,3-propanediamine, 1,6-hexanediamine, 2-methyl-1,5-pentanediamine, 1,7-diaminoheptane, 1,8-diaminooctane, 1,9-diaminononane, 1,10-diaminodecane, 1,12-diaminododecane, bis(4-aminocyclohexyl)methane, diethylenetriamine, beta, beta'-diaminodiethyl ether, beta, beta'-diaminodiethyl thioether, 4,9-dioxa-1,12-dodecanediamine, 4,7,10-trioxa-1,13-tridecanediamine, N-(2-aminoethyl)-1,3-propanediamine, 3,3'diamino-N-methyldipropylamine, 3,3'iminobispropylamine, spermidine, bis(hexamethylene)triamine, triethylenetetramine, N,N'-bis(3-aminopropyl)ethylenediamine, N,N'-bis(2-aminoethyl)-1,3-propanediamine, N,N'-bis(3-aminopropyl)-1,3-propanediamine, spermine, tris(2-aminoethyl)amine, tetraethylenepentamine, pentaethylenehexamine, phenylene diethyl amine, 1,3-diaminomethylxylene, 4,4'methylenebis (2-methylcyclohexylamine), 1,2-diaminocyclohexane, 1,3-diaminocyclohexane. 1,4-diaminocyclohexane, bis(1,3-aminomethyl)cyclohexane, isophorone diamine, 1,8-diamino-p-menthane, piperazine, 4,4'trimethylenedipiperidine, and the like and mixtures thereof. The degree of neutralization may be calculated from the amount of amine added to a copolymer of known acid content, or it may be measured directly through established analytical methods, as described, for example, in U.S. Pat. No. 3,328,367. In the alternative, the degree of neutralization may be calculated based on the changes in the infrared absorption spectrum of the copolymer, as described in U.S. Pat. No. 3,471,460. In one embodiment, the amine-neutralized ethylene acid copolymers are neutralized from about 10 to about 90 mol % with amines based on the total number of equivalents of copolymerized carboxylic acid residues in the ethylene acid copolymer. In an alternative embodiment, the amine-neutralized ethylene acid copolymers are neutralized from about 20 to 80 mol % with amines.

The coating composition may optionally comprise 0.1 to 20 percent by weight of one or more adhesion promoting agents based on the weight of the coating composition. All individual values and subranges from 0.1 to 20 weight percent are included herein and disclosed herein; for example, the weight percent can be from a lower limit of 0.1, 0.5, 1, 3, 5, 8, 10, 12, 15, or 18 to an upper limit of 3, 5, 8, 10, 12, 15, or 20. For example, the coating composition may optionally comprise 0.1 to 15 percent by weight of one or more adhesion promoting agents based on the weight of the coating composition; or in the alternative, the coating composition may optionally comprise 0.5 to 15 percent by weight of one or more adhesion promoting agents based on the weight of the coating composition; or in the alternative, the coating composition may optionally comprise 1 to 15 percent by weight of one or more adhesion promoting agents based on the weight of the coating composition; or in the alternative, the coating composition may optionally comprise 3 to 15 percent by weight of one or more adhesion promoting agents based on the weight of the coating composition; or in the alternative, the coating composition may optionally comprise 8 to 15 percent by weight of one or more adhesion promoting agents based on the weight of the coating composition.

The coating composition may further comprise one or more additive of the type conventionally added to polymers or polymer compositions. These additives include, for example, process oils, antioxidants, surface tension modifiers, anti-block agents, dispersants, blowing agents, linear or substantially linear EAOs, LDPE, LLDPE, lubricants, crosslinking agents such as peroxides, antimicrobial agents such as organometallics, isothiazolones, organosulfurs and mercaptans; antioxidants such as phenolics, secondary amines, phophites and thioesters; antistatic agents such as quaternary ammonium compounds, amines, and ethoxylated, propoxylated or glycerol compounds; fillers and reinforcing agents such as wollastonite, carbon black, glass, metal carbonates such as calcium carbonate, metal sulfates such as calcium sulfate, talc, clay or graphite fibers; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxy-phenylbenzotriazole, a 2-hydroxy, 4-alkoxyenzophenone, a salicylate, a cynoacrylate, a nickel chelate and a benzylidene malonate and oxalanilide; and zeolites, molecular sieves and other known deodorizers. An exemplary hindered phenolic antioxidant is Irganox™ 1076 antioxidant, available from Ciba-Geigy Corp. Skilled artisans can readily select any suitable combination of additives and additive amounts as well as the method of incorporating the additive(s) into the composition without undue experimentation. Typically, each of the above additives, if used, does not exceed 40 weight percent, based on total composition weight, and are advantageously from about 0.001 to about 20 weight percent; in the alternative, from about 0.01 to about 15 weight percent; and in another alternative, from about 0.1 to about 10 weight percent.

Process oils, which are often used to reduce any one or more of viscosity, hardness, modulus and cost of a composition, are a preferred additive. The most common process oils have particular ASTM designations depending upon whether they are classified as paraffinic, naphthenic or aromatic oils. An artisan skilled in the processing of elastomers in general will recognize which type of oil will be most beneficial. The process oils, when used, are desirably present in an amount within a range of from about 5 to about 40 weight percent, based on total composition weight.

The coating composition may further include at least one polydimethylsiloxane (PDMS) to improve the scratch mar resistance of the resulting product. The polydimethylsiloxane is typically present from 0.1 to 10 weight percent, based on the weight of the coatings composition. Suitable polydimethylsiloxanes include those having a viscosity at 25° C. of greater than 100,000 centistokes; or in the alternative, from $1 \times 10^6$ to $2.5 \times 10^6$ centistokes. Such scratch mar resistant agents include, but are not limited to, IRGASURF® SR 100, which is commercially available from Ciba-Geigy Corp.

The coating composition may optionally comprise 0.1 to 10 percent by weight of one or more scratch mar resistant agents based on the weight of the coating composition. All individual values and subranges from 0.1 to 10 weight percent are included herein and disclosed herein; for example, the weight percent can be from a lower limit of 0.1, 0.5, 1, 3, 5, 8, or 9 to an upper limit of 2, 3, 5, 8, 9, or 10. For example, the coating composition may optionally comprise 0.1 to 10 percent by weight of one or more scratch mar resistant agents based on the weight of the coating composition; or in the alternative, the coating composition may optionally comprise 0.5 to 10 percent by weight of one or more scratch mar resistant agents based on the weight of the coating composition; or in the alternative, the coating composition may optionally comprise 1 to 10 percent by weight of one or more scratch mar resistant agents based on the weight of the coating composition; or in the alternative, the coating composition may optionally comprise 3 to 10 percent by weight of one or more scratch mar resistant agents based on the weight of the coating composition; or in the alternative, the coating composition may optionally comprise 1 to 8 percent by weight of one or more scratch mar resistant agents based on the weight of the coating composition.

The coating compositions of the instant invention may further be blended with one or more polymers, prior to fabrication of an article. Such blending may occur by any of a variety of conventional techniques such melt blending or dry blending.

The coating composition may be in the form of particulate solids ranging in size from powders to chips. Powders are typically defined as particulate solids with an average particle size of less than 2000 microns. Pellets are particulate solids generally, but not exclusively, formed through extrusion and pelletization processes, with a typical average particle size greater than 2 mm, typically 2-4 mm. Micropellets typically have an average particle size less than of a standard pellet yet greater than general commercial die capabilities. The average particle size of micropellets range from 300 microns to 2 mm. The micropellets generally exhibit a semi-spheroidal shape. Chips are larger non-pellet particulate solids with average particle sizes of greater than 2 mm.

In process, the above described components may be blended via any conventional method; for example, the above described components may be melt blended via an extruder, e.g. a single screw extruder or a twin screw extruder, Banbury mixer, rollmill, and the like. Such methods are generally known to a person skilled in the art.

In one embodiment, the process for producing the inventive coating composition comprises the steps of: (1) providing an ethylene based copolymer composition, wherein the ethylene based copolymer composition comprises from 10 to 55 percent by weight based on the weight of the coating composition; (2) providing a propylene polymer composition, wherein the propylene polymer composition comprises from 5 to 25 percent by weight based on the weight of the coating composition; (3) providing a chlorinated olefin polymer composition, wherein the chlorinated olefin polymer composition comprises from 15 to 60 percent by weight based on the weight of the coating composition; (4) optionally providing a filler, wherein the filler comprises from less than 40 percent by weight based on the weight of the coating composition; (5) optionally providing an adhesion promoting agent, wherein the adhesion promoting agent comprises from 1 to 20 percent by weight based on the weight of the coating composition; (6) melt blending the ethylene based copolymer composition, the propylene polymer composition, the chlorinated olefin polymer composition, the optional filler and the optional adhesion promoting agent; (7) thereby producing the inventive coating composition.

The articles according to instant invention comprise optionally a substrate; and a coating comprising (a) 10 to 55 percent by weight of an ethylene based copolymer composition; (b) 5 to 25 percent by weight of a propylene polymer composition; (c) 15 to 60 percent by weight of a chlorinated olefin polymer composition; (d) optionally less than 40 percent by weight of a filler; and (e) optionally 1 to 20 weight percent by weight of an adhesion promoting agent.

In one embodiment, the articles according to the instant invention may further comprise a urethane top coating.

Articles according to instant invention may be made via conventional methods. Such methods include, but are not limited to, calendering process, lamination process, extrusion process, cast sheet process, or combinations thereof.

In one embodiment, the method for making the inventive article comprises the steps of: (1) providing a substrate; (2) providing a coating composition comprising (a) 10 to 55 percent by weight of an ethylene based copolymer composition; (b) 5 to 25 percent by weight of a propylene polymer composition; (c) 15 to 60 percent by weight of a chlorinated olefin polymer composition; (d) optionally less than 40 percent by weight of a filler; and (e) optionally 1 to 20 weight percent by weight of an adhesion promoting agent (3) coating the coating composition onto at least one surface of the substrate; and (4) thereby forming the inventive article.

In another embodiment, the method for making the inventive article comprises a coating step achieved via calendering process, lamination process, extrusion process, cast sheet process, or combinations thereof.

In another alternative embodiment, the method for making the inventive articles further comprises the step of coating the formed article with a urethane top coating.

A partial, far from exhaustive, listing of articles that can be fabricated from the inventive coating compositions include, but are not limited to, synthetic leather, automotive upholstery, recreational vehicle upholstery, marine upholstery, seating for hospitality, fitness equipment covering, footwear, apparel, banners, tarpaulins, awning, furniture upholstery, medical sheeting, medical drapery, floor covering, wall covering, window covering, book covering, or luggage. A skilled artisan can readily augment this list without undue experimentation.

EXAMPLES

The following examples illustrate the present invention but are not intended to limit the scope of the invention.

Formulations 1, 2, and 3 were made according to the following process. The formulation components listed in Table I, measured in weight percent based on the total weight of the formulation, were melt-blended via a twin screw extruder (92 mm diameter, co-rotating, intermeshing, 44/1 L/D).

Formulations 1, 2, and 3 were used to make the inventive coating compositions A, B, C according to the following process. The coating composition components listed in Table II, measured in weight percent based on the weight of the coating composition, were melt-blended via a twin screw extruder (30 mm co-rotating, intermeshing, 35/1 L/D). The coating compositions were pelletized via an underwater pelletizer.

The inventive coating compositions were calendered and laminated onto at least one surface of a substrate, i.e. polyester, via conventional calendering and lamination processes. A urethane top coating layer was further applied onto the article. These articles provided improved dry feel properties as well as improved calenderability.

Test Methods

Test methods include the following:
Density is measured according to ASTM D 792-03, Method B, in isopropanol.
Melt index ($I_2$) is measured at 190° C. under a load of 2.16 kg according to ASTM D-1238-03.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene} = 0.431(M_{polystyrene})$.

Polyethylene equivalent molecular weight calculations are performed using Viscotek TriSEC software Version 3.0.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}C$ resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety).

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Block Index

The ethylene/α-olefin interpolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$$2^{nd} \text{ moment weight average } BI = \sqrt{\frac{\Sigma(w_i(BI_i - ABI)^2)}{\frac{(N-1)\Sigma w_i}{N}}}$$

where N is defined as the number of fractions with $BI_i$ greater than zero. BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the ATREF (i.e., analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the olefin block copolymer. TAB can be calculated from the mole fraction of ethylene (measured by NMR) using the following equation:

$$\text{Ln } P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$\text{Ln } P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $LnP_X \leq \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from $\text{Ln } P_{XO} = \alpha/T_X + \beta$ using a measured value of $T_X$.

Once the block index (BI) for each preparative TREF fraction is obtained, the weight average block index, ABI, for the whole polymer can be calculated.

The present invention may be embodied in other forms without departing from the spirit and the essential attributes thereof, and, accordingly, reference should be made to the appended claims, rather than to the foregoing specification, as indicating the scope of the invention.

TABLE I

| Component Type | Component Name | Formulation 1 (Weight Percent) | Formulation 2 (Weight Percent) | Formulation 3 (Weight Percent) |
|---|---|---|---|---|
| Filler (Calcium Carbonate) | Atomite | 20 | 20 | — |
| Polypropylene Composition | Daploy WB 130 | 15.6 | 14.37 | — |
| Polypropylene Composition | Profax PD 191 | — | — | 25.2 |
| Ethylene Based Copolymer Composition | Engage 6386 | 46.9 | 43.13 | — |
| Ethylene Based Copolymer Composition | Engage 8180 | — | — | 59.4 |
| Paraffinic Oil | Paralux 6001R | 15 | 20 | 15 |
| Scratch Mar Resistance Agent | MB50-002 | 0.5 | 0.5 | — |
| Stabilizer (antioxidant) | Tripure | 2.0 | 2.0 | — |
| Other Additives | Sartomer SR 550 | — | — | 0.2 |
| Liquid Peroxide | Luperox 101 | — | — | 0.2 |

TABLE II

| Component Type | Component Name | Coating Composition A (Weight Percent) | Coating Composition B (Weight Percent) | Coating Composition C (Weight Percent) |
|---|---|---|---|---|
| Formulation 1 | — | 36.18 | — | — |
| Formulation 2 | — | — | 36.18 | — |
| Formulation 3 | — | — | — | 36.18 |
| Chlorinated Olefin Polymer Composition | Tyrin 3615P | 36.18 | 36.18 | 31.18 |
| Filler | CaCO$_3$ | 21.71 | 21.71 | 21.71 |
| Process Aid | Stearic Acid | 0.14 | 0.14 | 0.14 |
| Pigment | TiO$_2$ | 3.62 | 3.62 | 3.62 |
| Stabilizer | T878 (Tin) | 2.17 | 2.17 | 2.17 |
| Adhesion Promoting Agent | Amplify | — | — | 5 |

I claim:

1. A coating composition comprising:

10 to 55 percent by weight of an ethylene based copolymer composition comprising an ethylene-α/olefin copolymer;

5 to 25 percent by weight of a propylene polymer composition comprising a propylene-α/olefin copolymer having a melt flow rate of 0.1 to 150 g/10 minutes, measured at 230° C. and 2.16 Kg weight, a melting point in the range of from 130 to 180° C., and a melt strength in the range of 5 cN to 50 cN;

15 to 60 percent by weight of a chlorinated polyethylene; less than 40 percent by weight of a filler 1 to 20 weight percent by weight of an adhesion promoting agent comprising an acid or acid derivative functionalized polyolefin; and 0.1. to 10 percent by weight of one or more scratch mar resistance agents.

2. The composition according to claim 1, wherein said composition further comprising a stabilizing agent.

3. The composition according to claim 1, wherein said composition further comprising a processing aid.

4. The composition according to claim 1, wherein said composition further comprising a pigment.

5. The composition according to claim 1, wherein said composition further comprising a plasticizer.

6. The composition according to claim 1, wherein said composition further comprising an antibacterial agent.

7. The composition according to claim 1, wherein said filler is calcium carbonate.

8. The composition according to claim 1, wherein said adhesion promoting agent is maleic anhydride grafted polyolefin copolymer.

* * * * *